(12) United States Patent
Roy et al.

(10) Patent No.: US 7,154,972 B2
(45) Date of Patent: Dec. 26, 2006

(54) RECEIVER-SIDE ADAPTIVE EQUALIZATION IN SOURCE-SYNCHRONOUS CHIP-TO-CHIP COMMUNICATION SYSTEMS

(75) Inventors: Aninda K. Roy, San Jose, CA (US); Claude R. Gauthier, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 817 days.

(21) Appl. No.: 10/325,542

(22) Filed: Dec. 18, 2002

(65) Prior Publication Data

US 2004/0120430 A1    Jun. 24, 2004

(51) Int. Cl.
   *H04B 1/10* (2006.01)
(52) U.S. Cl. ...................................... 375/350
(58) Field of Classification Search ............... 375/350, 375/229, 232, 233
   See application file for complete search history.

(56) References Cited

U.S. PATENT DOCUMENTS

| 6,559,894 B1 * | 5/2003 | Omura et al. | 348/614 |
| 6,816,204 B1 * | 11/2004 | Limberg | 348/614 |
| 6,952,444 B1 * | 10/2005 | Segal et al. | 375/232 |
| 2004/0071241 A1 * | 4/2004 | Bouillet et al. | 375/347 |

* cited by examiner

*Primary Examiner*—Khai Tran
(74) *Attorney, Agent, or Firm*—Osha-Liang LLP

(57) ABSTRACT

A communication system comprising transmitting circuitry arranged to transmit a data signal and a timing signal; and receiving circuitry arranged to receive the data signal and the timing signal. The receiving circuitry comprises a first finite impulse response filter arranged to generate a filtered timing signal dependent on the timing signal and a at least one mixer signal; a decision feedback circuit arranged to generate the at least one mixer signal dependent on the filtered timing signal and a calibration signal; and a second finite impulse response filter arranged to generate a filtered data signal dependent on the data signal and the at least one mixer signal.

26 Claims, 6 Drawing Sheets

US 7,154,972 B2

RECEIVER-SIDE ADAPTIVE EQUALIZATION IN SOURCE-SYNCHRONOUS CHIP-TO-CHIP COMMUNICATION SYSTEMS

BACKGROUND OF INVENTION

A typical computer system includes at least a microprocessor and some form of memory. The microprocessor has, among other components, arithmetic, logic, and control circuitry that interpret and execute instructions necessary for the operation and use of the computer system. FIG. 1 shows a typical computer system (10) having a microprocessor (12), memory (14), integrated circuits (16) that have various functionalities, and communication paths (18, 20), i.e., buses and wires, that are necessary for the transfer of data among the aforementioned components of the computer system (10).

A rate of transfer of data is known as "bandwidth." Bandwidth affects overall system performance. FIG. 2 shows integrated circuits (16A, 16B) connected by a bus (20). Typically, to increase the bandwidth between integrated circuits (16A, 16B), the number of pins associated with the integrated circuits (16A, 16B) are increased and the bus (20) is widened, e.g., a sixty-four bit bus is increased to a one hundred twenty-eight bit bus. However, the increase in the number of pins associated with the integrated circuits (16A, 16B) and/or the increase in the width of the bus (20) increases system costs with respect to area, power consumption, and pin count.

Because of the system costs associated with increasing bus size, maximizing the amount of bandwidth that is available becomes increasingly important. FIG. 3 shows a set of data lines and a clock line in a bus. The bus (20) includes a set of data lines (30) and a clock line (32). The set of data lines (30) carry packets of data in the form of a data signal to a receiver (not shown). The clock line (32) carries a timing signal to the receiver, in order for the receiver to have a time reference to sample the data signals.

In this design, the timing signal is integral to the proper functioning of the integrated circuits (16A, 16B). Timing uncertainty introduced from various sources can affect the proper sampling of data signals. Timing uncertainty may be skew or jitter. Skew is a result of unequal line lengths and variations in delay. Skew results from variations in the manufacture of integrated circuits, printed circuit boards, and components. Jitter is typically a result of signal amplitude noise and power supply noise that may result from voltage, switching frequency, and temperature variations. Both skew and jitter may contribute to timing uncertainty; thereby affecting data transmission.

SUMMARY OF INVENTION

In general, one aspect of the invention involves a communication system. The communication system comprises transmitting circuitry arranged to transmit a data signal and a timing signal; and receiving circuitry arranged to receive the data signal and the timing signal. The receiving circuitry comprises a first finite impulse response filter arranged to generate a filtered timing signal dependent on the timing signal and a at least one mixer signal; a decision feedback circuit arranged to generate the at least one mixer signal dependent on the filtered timing signal and a calibration signal; and a second finite impulse response filter arranged to generate a filtered data signal dependent on the data signal and the at least one mixer signal.

In general, one aspect of the invention involves a method for synchronizing a receiver-side communication system. The method comprises transmitting a timing signal and a data signal from transmitting circuitry; receiving the timing signal and the data signal. The receiving comprises inputting a timing signal to a first finite impulse response filter; inputting a data signal to a second finite impulse response filter; generating a filtered timing signal from the first finite impulse response filter; inputting the filtered timing signal and a calibration signal to a decision feedback circuit; generating at least one mixer signal from the decision feedback circuit; and inputting the at least one mixer signal to the first finite impulse response filter and the second finite impulse response filter.

In general, one aspect of the invention involves a communication system. The communication system comprises means for transmitting circuitry arranged to transmit a data signal and a timing signal; and means for receiving circuitry arranged to receive the data signal and the timing signal. The receiving circuitry comprises a first means for outputting a filtered timing signal dependent on the timing signal and a mixer signal; means for generating at least one mixer signal dependent on the filtered timing signal; and a second means for outputting a filtered data signal dependent on the data signal and the at least one mixer signal.

Other aspects and advantages of the invention will be apparent from the following description and the appended claims.

DETAILED DESCRIPTION

Figure 1:
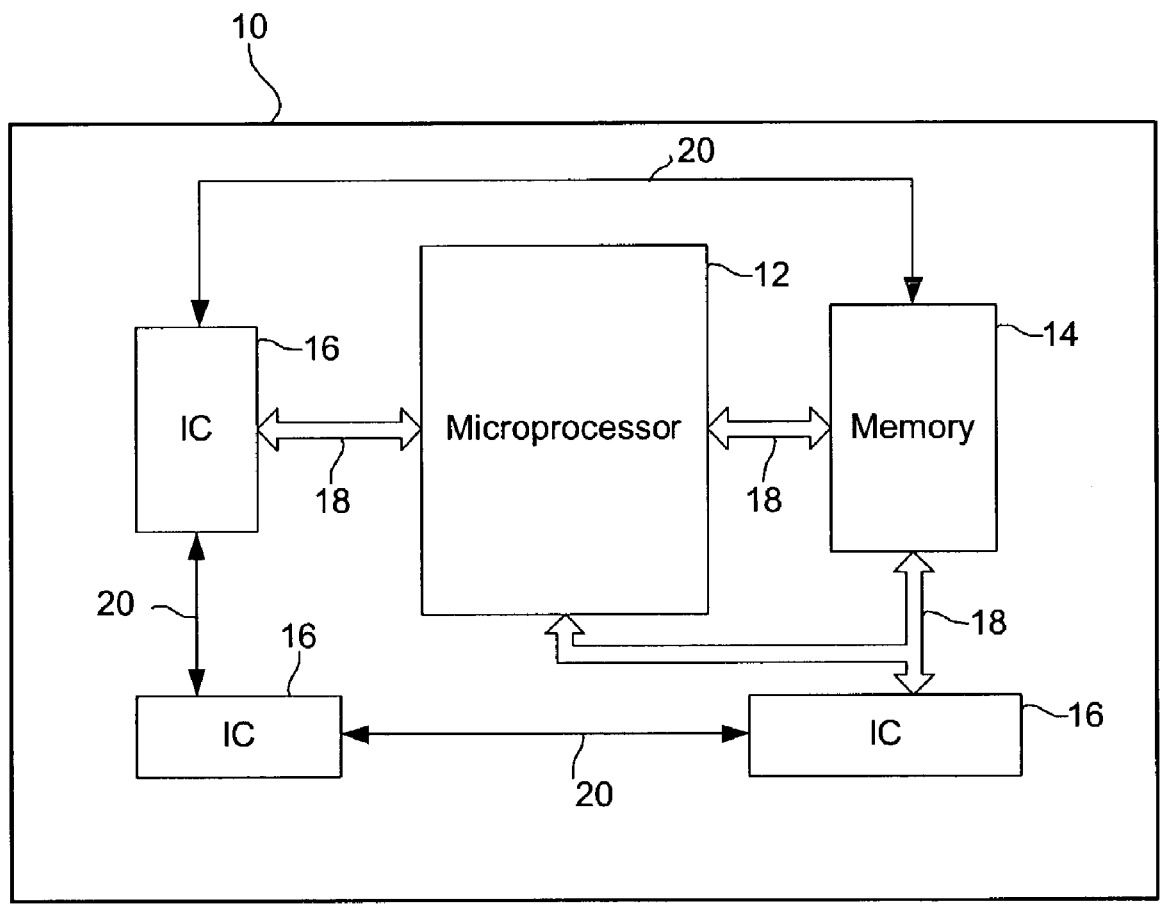
FIG. 1 shows a typical computer system.
Figure 2:
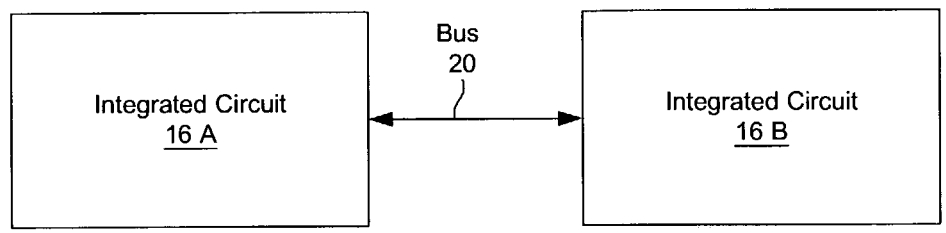
FIG. 2 shows a typical pair of integrated circuits connected by a bus.

Specific embodiments of the invention will now be described in detail with references to the accompanying figures. Like elements in the various figures are denoted by like reference numerals throughout the figures for consistency.

Figure 4:
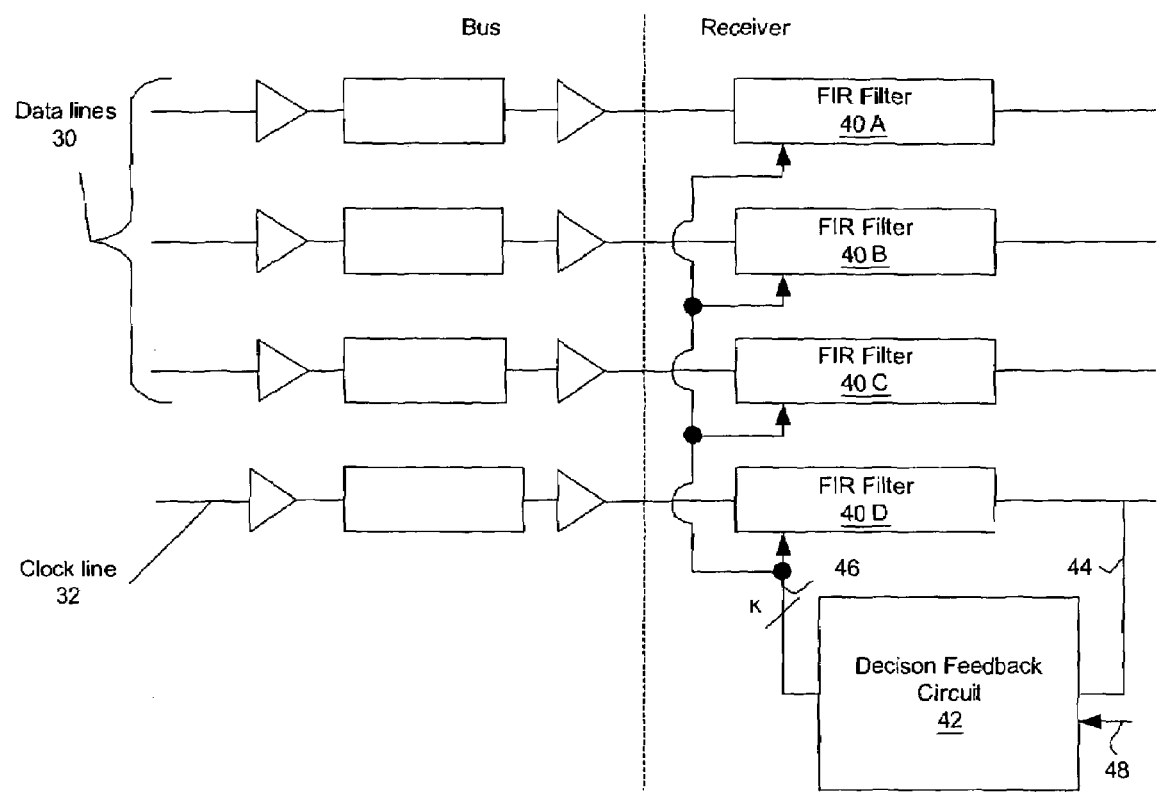
FIG. 4 shows a set of finite impulse response filters and a decision feedback circuit in accordance with an embodiment of the present invention.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention Embodiments of the invention relate to a receiver-side synchronization device for synchronizing communication systems between integrated circuits. FIG. 4 shows a set of finite impulse response filters and a decision feedback circuit in accordance with an embodiment of the present invention. In FIG. 4, the set of data lines (30) and the clock line (32)

transmit the set of data signals and the timing signal, respectively, to a set of finite impulse response (FIR) filters (40A–40D). The set of data lines (30) and the clock line (32) are source-synchronous. Thus, the set of data signals and the timing signals are transmitted at the same time from a transmitter (not shown).

The FIR filter (40D) produces a filtering effect in the timing signal and outputs a filtered timing signal on a signal path (44) to a decision feedback circuit (42). A pre-determined calibration signal on pattern path (48) is also input to the decision feedback circuit (42). The decision feedback circuit (42) outputs a set of mixer signals on mixer paths (46) to the FIR filters (40A–40D) in response to the filtered timing signal on path signal (44). The set of mixer signals adjust the filtering effects produced by the set of FIR filters (40A–40D) that synchronize the timing signal and the set of data signals on the receiver-side. Because the channel characteristics of data lines (30) and the clock line (32) are similar and because similar signal amplitude noise and power supply noise affects both the timing signals and the data signals, adjustments made using the timing signal also equalizes the set of data signals on the receiver-side.

The FIR filters (40A–40D) may be analog or digital. In one or more embodiments, an analog FIR filter may be used. The analog FIR filter typically contains electronic circuits including resistors, capacitors, op-amps, etc. to produce a filtering effect.

In one or more embodiments, the one or more FIR filters may be digital. The digital FIR filter typically uses a digital signal processor or delay circuits with mixers to produce a filtering effect, e.g., remove undesirable parts of a signal. Digital FIR filters input a raw signal that is sampled at a particular time interval and output a filtered signal. The filtered signal is the result of a filtering effect produced by characteristics of the digital FIR filter.

In one or more embodiments, a raw signal may be defined by the function:

$$V = x(t), \quad (1)$$

where t is time. The raw signal is sampled at time intervals h (i.e., the sampling interval). Therefore, the value of the raw signal at time t=ih is:

$$x_i = x(ih), \quad (2)$$

where "i" is the time index.

Thus, the digitized (i.e., sampled) signal may be represented as $x_0, x_1, x_2, \ldots, x_n$ corresponding to values of the raw signal at times 0, h, 2h, $\ldots$, nh. The digitized signal is used by the digital FIR filter to produce the filtering effect and outputs the filtered signal $y_0, y_1, y_2, \ldots, y_n$.

In general, a digital FIR filter may be represented with the following equation:

$$y_n = a_0 x_n + a_1 x_{n-1} + \ldots a_z x_{n-z} \quad (3).$$

The constants $a_0$, $a_1$, and $a_z$ are filter coefficients. The value and number of the filter coefficients determine the filtering effect.

In one or more embodiments, a filtering effect may be a gain, a delay, etc. One skilled in the art will understand that a variety of filters may be used to produce different filtering effects to equalize the timing signal and data signals on the receiver side.

Figure 5:
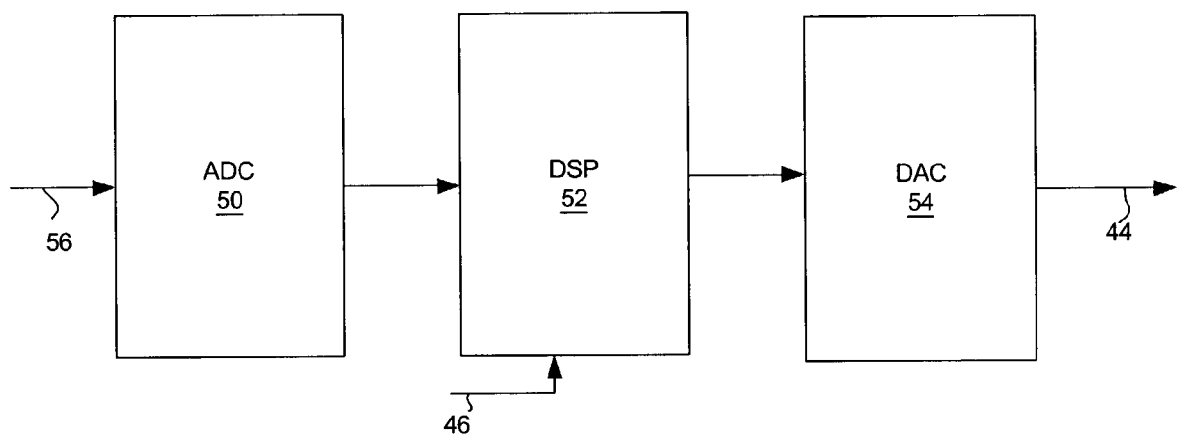
FIG. 5 shows an analog to digital converter, a digital signal processor, and a digital to analog converter in accordance with an embodiment of the present invention.

As previously mentioned, digital FIR filters typically use a digital signal processor or delay circuits with mixers to produce a filtering effect. FIG. 5 shows a digital FIR filter that uses a digital signal processor in accordance with an embodiment of the present invention.

In an exemplary embodiment, as shown in FIG. 5, the digital FIR filter includes an analog to digital converter (ADC) (50), a digital signal processor (DSP) (52), and a digital to analog converter (DAC) (54). A "raw signal" is input on input path (56) to the ADC (50), which outputs a "digitized signal." The DSP (52) inputs the digitized signal and produces a filtering effect using the coefficients shown in Equation 4, on the digitized signal; thereby generating a "filtered signal." The filtered signal is then input to the DAC (54).

The DSP (52) also receives a set of mixer signals on the mixer path (46). The set of mixer signals on the mixer path (46) modifies the values of the filter coefficients stored in the DSP (52) to adjust the filtering effect.

One skilled in the art will understand that an analog to digital converter and a digital to analog converter may be implemented in a variety of ways. Further, one skilled in the art will understand that the raw signal may refer to a timing signal or a data signal, such that, the digitized signal may refer to a digitized timing signal or a digitized data signal, and the filtered signal may refer to a filtered timing signal or a filtered data signal.

Figure 3:
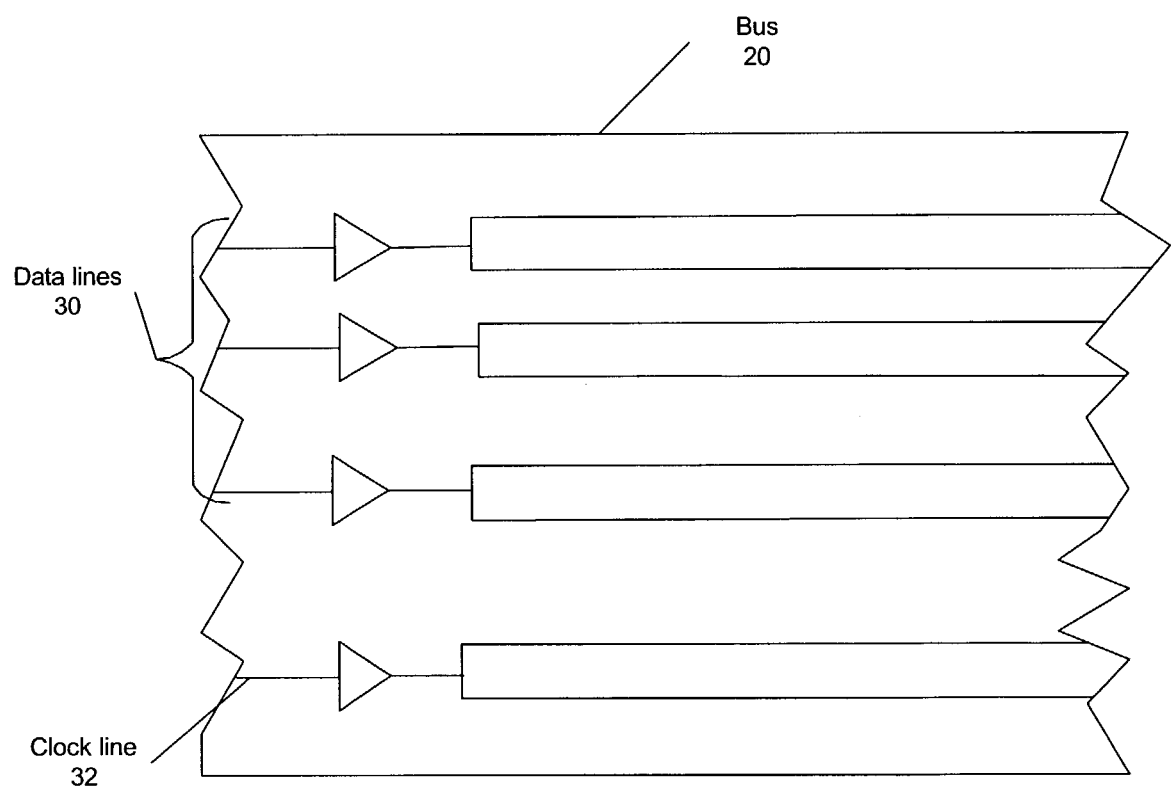
FIG. 3 shows a typical bus.

For example, the timing signal transmitted on the clock line (32) in FIGS. 3 and 4 is considered a raw signal. The timing signal is input to the ADC (50) which outputs a digitized timing signal. The digitized timing signal is input to the digital FIR filter implemented using a DSP (52) to generate the filtered timing signal. The filtered timing signal is then input to the DAC (54).

Figure 6:
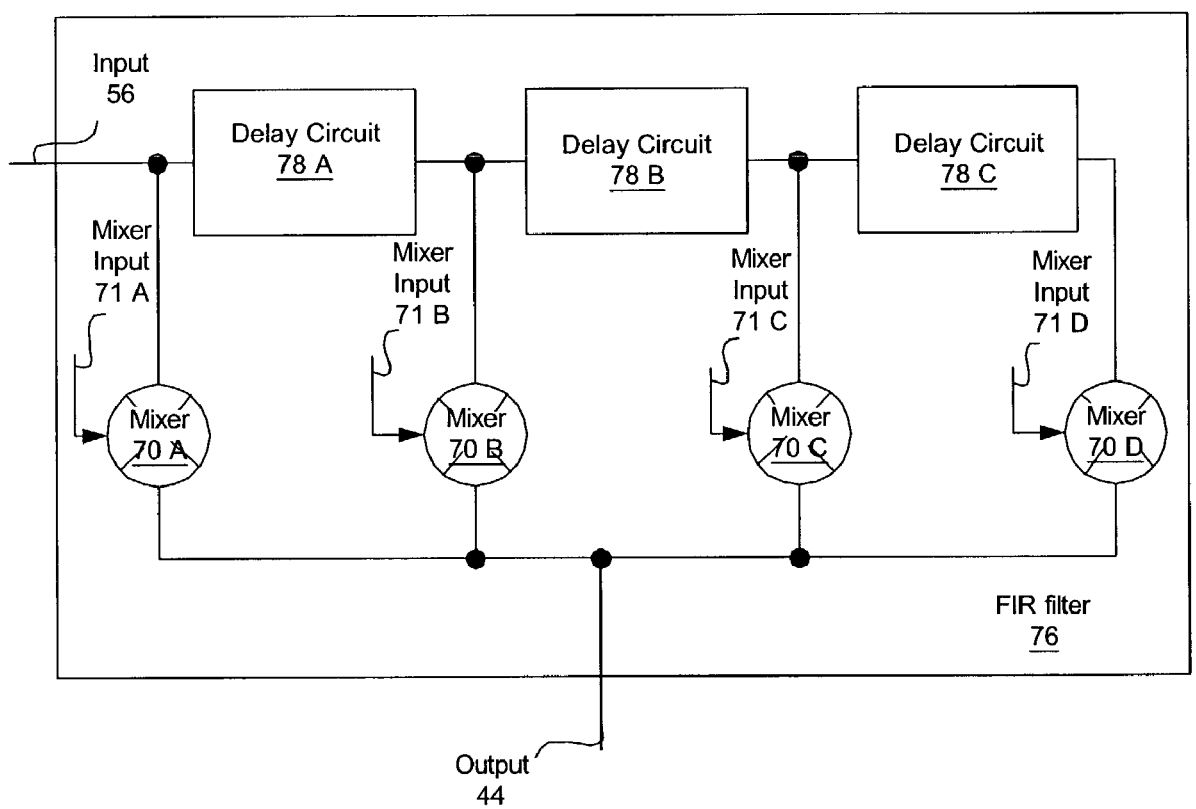
FIG. 6 shows a finite impulse response filter that includes a set of delay circuits in accordance with an embodiment of the present invention.

In another embodiment, delay circuits with mixers produce the filtering effect. FIG. 6 shows a digital FIR filter that includes a set of delay circuits and mixers in accordance with an embodiment of the present invention.

The digital FIR filter (for clock line FIR filter only.) includes a set of mixers (70A–7D) and a set of delay circuits (78A–78C). The set of mixers (70A–70D) are directly associated with the coefficients in Equation 4, namely $a_0$, $a_1$, and $a_z$. For example, the mixer (70A) is a multiplier that multiplies the raw signal by $a_1$ and the mixer (70B) is a multiplier that multiplies the raw signal by $a_2$.

An input (56) propagating a timing signal is input to a mixer (70A) and a delay circuit (78A), whereby the delay circuits (78A–78C) create a "digital effect," the "digitized" signal (i.e., delayed signal). The mixer (70A) outputs a modified timing signal and the delay circuit (78A) outputs a delayed signal to a mixer (70B) and a delay circuit (78B); the delay circuit (78B) outputs a second delayed signal to a mixer (70C) and a delay circuit (78C); and the delay circuit (78C) outputs a third delayed signal to a mixer (70D). An output (44) of the set of mixers (70A–70D) outputs the filtered signal.

Because the set of mixers (70A–70D) are associated with the filter coefficients, the set of mixers (70A–70D) control the filtering effect of the FIR digital filter (76). The set of mixers (70A–70D) also receive a set of mixer signals through the mixer inputs (71A–71D) that modify the coefficients associated with the set of mixers (70A–70D), respectively. One skilled in the art will understand that fewer or additional mixers may be used to produce a desired filter effect on the sampled signal.

Figure 7:
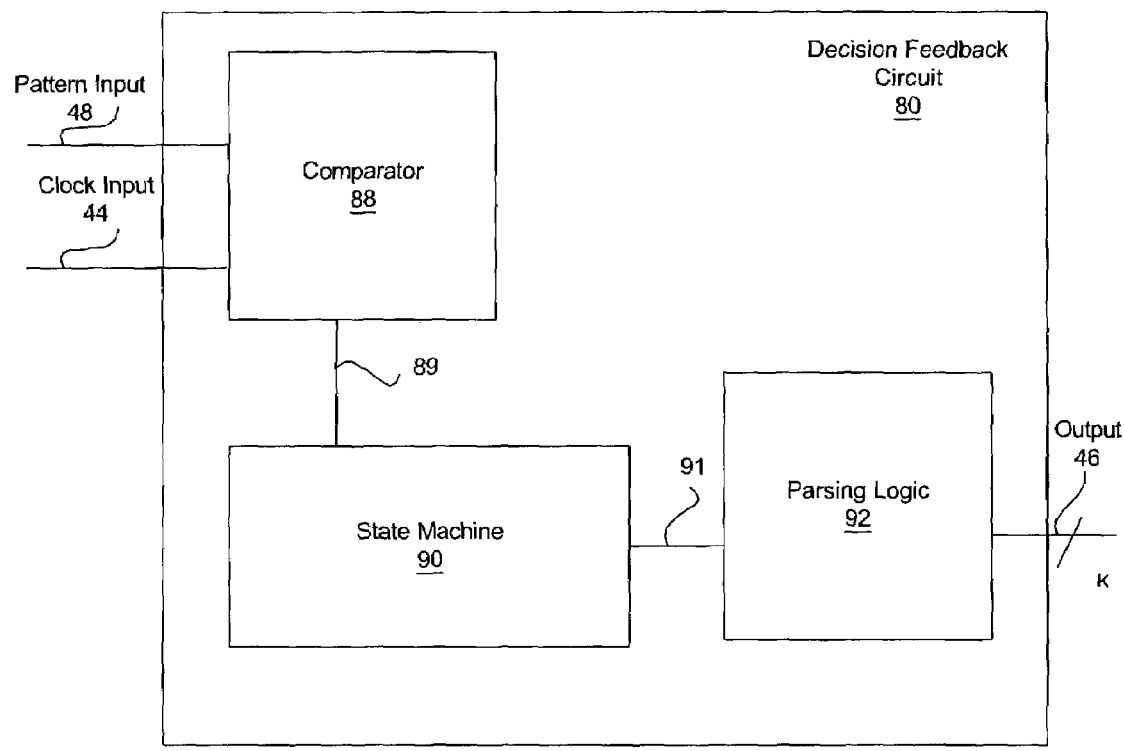
FIG. 7 shows a decision feedback circuit in accordance with an embodiment of the present invention.

Referring back to FIG. 4, the set of mixer signals on the mixer path (46) shown in FIG. 4 are produced by a decision feedback circuit (42). FIG. 7 shows an exemplary decision feedback circuit in accordance with an embodiment of the present invention. An exemplary decision feedback circuit

(80) outputs the set of mixers signals in response to a pre-determined calibration signal input through pattern input (48) and the filtered timing signal input through the clock input (44). The decision feedback circuit (80) includes a comparator (88), a state machine (90), and parsing logic (92). The comparator (88) compares the pre-determined calibration signal on pattern input (48) and the filtered timing signal on clock input (44) and outputs an error signal (89). Because the expected values for the filtered timing signal is known a priori, the pre-determined calibration signal to which the filtered timing signal can be compared is also known.

The error signal (89) is input to the state machine (90) that identifies patterns within the error signal (89) and outputs an equalizing signal (91). The equalizing signal (91) is input to parsing logic (92) and according to the parsing logic (92), a set of mixer signals are generated that are associated with each mixer, i.e., filter coefficient. One skilled in the art will understand that the decision feedback circuit may be implemented in a variety of ways to compare a pre-determined calibration signal and a filtered timing signal and output a set of mixer signals.

In one example, referring now to FIG. 4, a set of data signals and a timing signal are transmitted through the set of data lines (30) and the clock line (32). In a receiver, the timing signal, V=x(t), is input to the FIR filter (40D). The timing signal is sampled at discrete time intervals, 0, 1, . . . , z such that the timing signal may be represented as $x_0, x_1, \ldots, x_z$.

Referring now to FIG. 6, a timing signal is input to the FIR filter (76) through input (56). The delay circuits (78A–78C) and the set of mixers (70A–70D) receive the timing signal. The set of mixers (70A–70D) are associated with coefficients $a_0, a_1, \ldots, a_z$, in which the timing signal is multiplied (as the mixers are multipliers), resulting in the following filtered signal:

$$y_n = a_0 x_n + a_1 x_{n-1} + \ldots a_z x_{n-z}. \tag{4}$$

Referring now to FIG. 7, the filtered signal is input to the decision feedback circuit (80) through clock input (44) and compared to a pre-determined calibration signal input through pattern input (48) using the comparator (88). The comparator (88) produces an error signal which is input to the state machine (90) that outputs to parsing logic (92). The parsing logic outputs a set of mixer signals through output (46).

Referring back to FIG. 4, the set of mixer signals on mixer path (46) are input to the FIR filters (40A–40D) and the coefficients are adjusted appropriately. Accordingly, the channel characteristics of both the timing signals and the data signals are modified for equalization on the receiver side. Therefore, any noise introduced due to skew or jitter may be significantly reduced by filtering the noise using FIR filters that allow for proper transmission of the timing signal and data signals.

Advantages of the present invention may include one or more of the following. In one or more embodiments, the present invention allows timing signals and data signals in a bus to adaptively equalize on the receiver-side. The invention allows bandwidth to be maximized while reducing timing uncertainty. The invention allows use of a digital finite impulse response filter that is programmable and changeable, additionally, the digital finite impulse response filter are stable with respect to time and temperature.

In one or more embodiments, mixers in a digital finite impulse response filter may be a mixer circuit that multiplies a signal, i.e., a data signal or a timing signal, by a filter coefficient.

In one or more embodiments, the synchronizing between communication systems may be performed in an execution mode, i.e., real time. Additionally, the synchronizing between communication systems may be performed in a test mode.

In one or more embodiments, because the timing signal is known a priori, a decision feedback circuit may equalize the channel characteristics of both the timing signals and data signals.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An integrated circuit to integrated circuit communication system comprising:
   transmitting circuitry arranged to transmit a data signal and a timing signal; and
   receiving circuitry arranged to receive the data signal and the timing signal, wherein the receiving circuitry comprises:
      a first finite impulse response filter arranged to generate a filtered timing signal dependent on the timing signal and a at least one mixer signal;
      a decision feedback circuit arranged to generate the at least one mixer signal dependent on the filtered timing signal and a calibration signal; and
      a second finite impulse response filter arranged to generate a filtered data signal dependent on the data signal and the at least one mixer signal;
   wherein the integrated circuit to integrated circuit communication system provides receiver-side adaptive equalization for source-synchronous chip-to-chip communications.

2. The communication system of claim 1, wherein the first finite impulse response filter and a second finite impulse response filter is a digital filter.

3. The communication system of claim 2, wherein the first digital finite impulse response filter comprises a first mixer circuitry arranged to generate a filtered timing signal dependent on the timing signal and the at least one mixer signal.

4. The communication system of claim 2, wherein the first digital finite impulse response filter, comprising:
   a first mixer circuitry arranged to generate a modified timing signal dependent on the timing signal and a first mixer signal;
   a delay circuit arranged to generate a delayed timing signal dependent on the timing signal; and
   a second mixer circuitry arranged to generate the filtered timing signal dependent on the delayed timing signal, a second mixer signal, and the modified timing signal.

5. The communication system of claim 2, wherein the second digital finite impulse response filter comprises a first mixer circuitry arranged to generate a filtered timing signal dependent on the timing signal and the at least one mixer signal.

6. The communication system of claim 2, wherein the second digital finite impulse response filter, comprising:

a first mixer circuitry arranged to generate a modified timing signal dependent on the timing signal and a first mixer signal;
a delay circuit arranged to generate a delayed timing signal dependent on the timing signal; and
a second mixer circuitry arranged to generate the filtered timing signal dependent on the delayed timing signal and a second mixer signal.

7. The communication system of claim 2, wherein the first digital finite impulse, comprises:
an analog to digital converter arranged to generate a digitized timing signal dependent on the timing signal;
a digital signal processor arranged to generate a filtered digitized timing signal dependent on the digitized timing signal and the at least one mixer signal; and
a digital to analog converter arranged to generate the filtered timing signal dependent on the filtered digitized timing signal.

8. The communication system of claim 2, wherein the second digital finite impulse, comprises:
an analog to digital converter arranged to generate a digitized data signal dependent on the data signal;
a digital signal processor arranged to generate a filtered digitized data signal dependent on the digitized data signal and the at least one mixer signal; and
a digital to analog converter arranged to generate the filtered data signal dependent on the filtered digitized data signal.

9. The communication system of claim 1, wherein the decision feedback circuit, comprises:
a comparator arranged to generate an error signal dependent on the calibration signal and the filtered timing signal;
a state machine arranged to generate an equalization signal dependent on the error signal; and
a parsing circuitry arranged to generate at least one mixer signal dependent on the equalization signal.

10. The communication system of claim 9, wherein the calibration signal is the timing signal.

11. The communication system of claim 1, wherein a number of mixer circuits in the first digital finite impulse response filter is equal to a number of mixer circuits in the second finite impulse response filter.

12. The communication system of claim 1, wherein the system uses an execution mode.

13. The communication system of claim 1, wherein the system uses a test mode.

14. A method for synchronizing a receiver-side integrated circuit to integrated circuit communication system, comprising:
transmitting a timing signal and a data signal from transmitting circuitry;
receiving the timing signal and the data signal comprising:
inputting a timing signal to a first finite impulse response filter;
inputting a data signal to a second finite impulse response filter;
generating a filtered timing signal from the first finite impulse response filter;
inputting the filtered timing signal and a calibration signal to a decision feedback circuit;
generating at least one mixer signal from the decision feedback circuit; and
inputting the at least one mixer signal to the first finite impulse response filter and the second finite impulse response filter;

wherein the integrated circuit to integrated circuit communication system provides receiver-side adaptive equalization for source-synchronous chip-to-chip communications.

15. The method of claim 14, wherein the inputting the at least one mixer signal to the first digital finite impulse response filter, comprises:
inputting the at least one mixer signal and the timing signal to a first mixer circuit;
producing a filtering effect in response to the at least one mixer signal and the timing signal; and
generating the filtered timing signal in response to the filtering effect.

16. The method of claim 14, wherein inputting a timing signal comprises multiplying the timing signal by a filter coefficient; and
wherein inputting a data signal comprises multiplying the data signal by a filter coefficient.

17. The method of claim 14, wherein inputting the at least one mixer signal to the first digital finite impulse response filter, comprises:
inputting a first mixer signal and timing signal to a first mixer circuit;
producing a first filtering effect responsive to the first mixer signal and timing signal;
inputting the timing signal to a delay circuit;
generating a delayed timing signal using the delay circuit;
inputting a second mixer signal and the delayed timing signal to a second mixer circuit;
producing a second filtering effect responsive to the second mixer signal and the delayed timing signal;
generating a filtered timing signal responsive to the first and second filtering effect.

18. The method of claim 14, wherein the inputting the at least one mixer signal to the second digital finite impulse response filter, comprises:
inputting the at least one mixer signal and the data signal to a mixer circuit;
producing the a filtering effect in response to the at least one mixer signal and the timing signal; and
generating the filtered data signal in response to the filtering effect.

19. The method in one of the claims 18, wherein inputting comprises multiplying the data signal by a filter coefficient.

20. The method of claim 14, wherein inputting the at least one mixer signal to the second digital finite impulse response filter, comprises:
inputting a first mixer signal and data signal to a first mixer circuit;
producing a first filtering effect responsive to the first mixer signal and data signal;
inputting the data signal to a delay circuit;
generating a delayed data signal using the delay circuit;
inputting a second mixer signal and the delayed data signal to a second mixer circuit;
producing a second filtering effect responsive to the second mixer signal and the delayed data signal;
generating a filtered data signal responsive to the first and second filtering effect.

21. The method of claim 14, wherein the inputting the at least one mixer signal to the first digital finite impulse response filter associated with the clock line, comprises:
inputting the timing signal to an analog to digital converter;
generating a digitized timing signal;
inputting the digitized timing signal and the at least one mixer signal to a digital signal processor;

calculating a filtering effect responsive to the at least one mixer signal and the digitized timing signal;
generating a filtered digitized timing signal responsive to the filtering effect;
inputting the filtered digitized timing signal to a digital to analog converter; and
outputting a filtered timing signal.

22. The method of claim 14, wherein the inputting the at least one mixer signal to the first digital finite impulse response filter associated with the clock line, comprises:
inputting the timing signal to an analog to digital converter;
generating a digitized timing signal;
inputting the digitized timing signal and the at least one mixer signal to a digital signal processor;
calculating a filtering effect responsive to the at least one mixer signal and the digitized timing signal;
generating a filtered digitized timing signal responsive to the filtering effect;
inputting the filtered digitized timing signal to a digital to analog converter; and
outputting a filtered timing signal.

23. The method of claim 15, wherein the generating the at least one mixer signal, comprises:
inputting a calibration signal and the filtered timing signal to a comparator;
generating an error signal from the comparator;
inputting the error signal to a state machine;
generating an equalizing signal from the state machine;
inputting the equalizing signal to a parsing circuit; and
generating the at least one mixer signal from the parsing circuit.

24. The method of claim 15, wherein the synchronizing of the communication system occurs in execution mode.

25. The method of claim 15, wherein the synchronizing of the communication system occurs in test mode.

26. An integrated circuit to integrated circuit communication system comprising:
means for transmitting circuitry arranged to transmit a data signal and a timing signal; and
means for receiving circuitry arranged to receive the data signal and the timing signal, wherein the receiving circuitry comprises:
a first means for outputting a filtered timing signal dependent on the timing signal and a mixer signal;
means for generating at least one mixer signal dependent on the filtered timing signal; and
a second means for outputting a filtered data signal dependent on the data signal and the at least one mixer signal;
wherein the integrated circuit to integrated circuit communication system provides receiver-side adaptive equalization for source-synchronous chip-to-chip communications.

* * * * *